Aug. 14, 1934.    L. A. LUX    1,969,983
WATER SOFTENING COMPOSITION AND METHOD
Filed Dec. 24, 1932
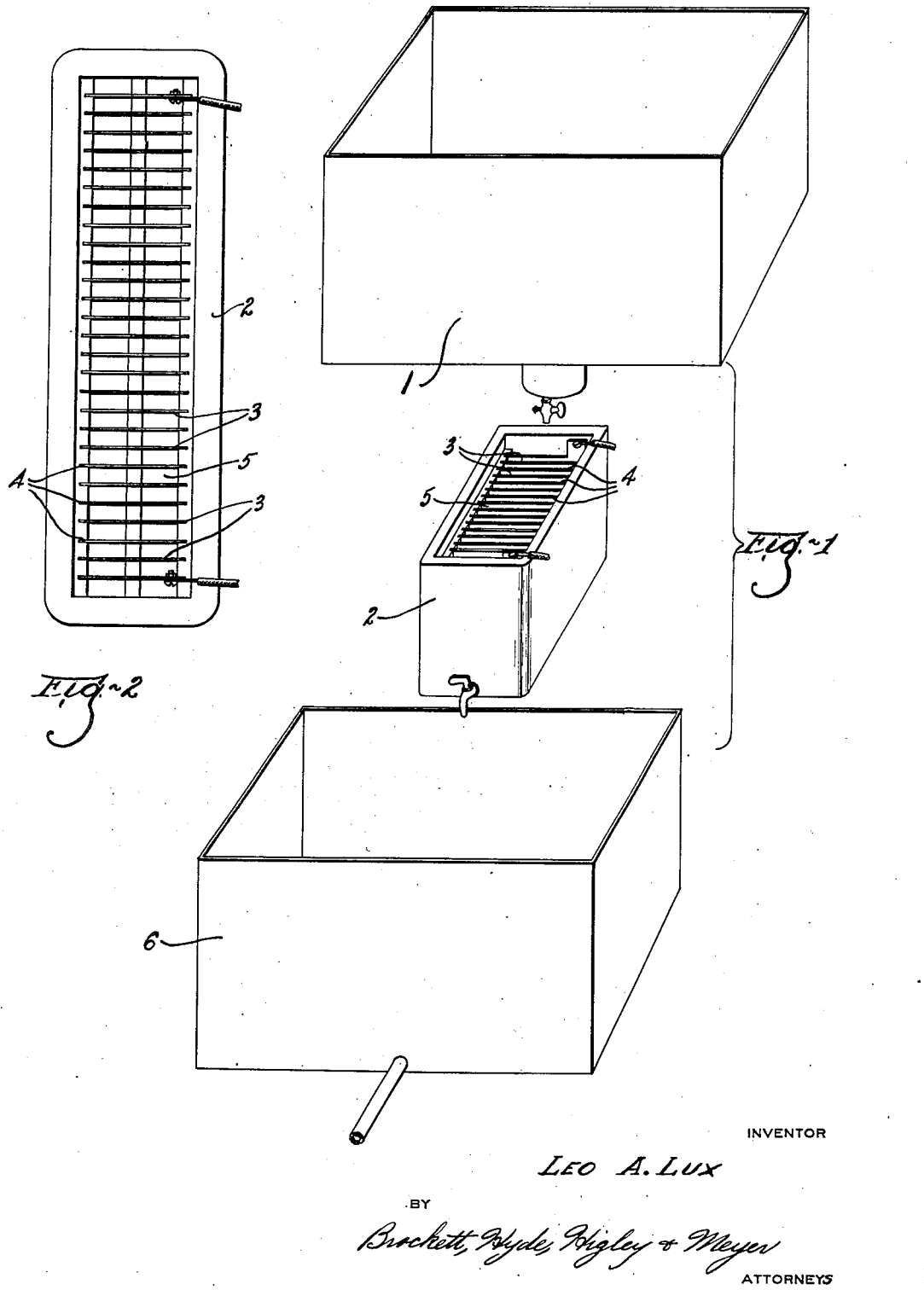
INVENTOR
LEO A. LUX
BY
Brockett, Hyde, Higley & Meyer
ATTORNEYS Patented Aug. 14, 1934

1,969,983

UNITED STATES PATENT OFFICE 1,969,983

WATER SOFTENING COMPOSITION AND METHOD

Leo A. Lux, Lakewood, Ohio, assignor, by direct and mesne assignments, to The Lux Electrolyzer Service, Incorporated, a corporation of Ohio Application December 24, 1932, Serial No. 648,765

15 Claims. (Cl. 204—25)

This invention relates to the softening and purification of water by the use of an improved treating compound therefor, and to method and apparatus for preparation of such compound. The invention is capable of use wherever it is desired to soften and purify water, such as for drinking purposes or where the water is to be used for cleaning purposes, such as in a laundry, but it has more particular application to the softening and purification of water intended for use in boilers, condensers or the like, and for convenience the description hereinafter will be confined more or less to the treatment of boiler water, although the invention is not so limited.

One object of the invention is to provide a water purification method and apparatus which avoids any necessity of large and expensive equipment for filtering and storage, such as is necessary in connection with most water softening systems, and, further, to provide a method which makes it possible to control the characteristics of the water in such manner as to secure maximum precipitation or separation of impurities without the introduction of large or excess quantities of chemical reagents, thereby avoiding high alkalinity, and high concentration of dissolved or other salts or reagents, with the consequent corrosive action, foaming and other undesirable factors accompanying the use of excess reagents in boiler practice.

The invention further has for its object to utilize electric current in connection with the treatment of water for softening or purifying the same, but nevertheless not by the application of the electric current directly to the water to be treated, the invention providing method and apparatus for the use and application of electric current to a treating compound including water and a suitable electrolyte, the effect being to dissociate and ionize the solution, modify its chemical constituents and characteristics and provide a treating compound which when introduced into the water to be treated precipitates or causes the deposition in flocculent form of all solid materials, either for separation thereof by filtration or the like, or for the purpose of so modifying such materials that they do not interfere with efficient boiler operation.

Further objects of the invention are in part obvious and in part will appear more in detail hereinafter.

In the drawing Fig. 1 illustrates, more or less diagrammatically and in perspective, one form of apparatus suitable for the production of the improved water treating compound; and Fig. 2 is a plan view of the electrolytic cell.

According to the present method, the water to be treated may have more or less widely varying characteristics, such as variations in the amount of temporary or permanent hardness or both, as well as variations with respect to its degree of alkalinity or acidity, or, in other words, its hydrogen ion concentration, the improved method being of such character as by relatively simple control methods and manipulation to be capable of modification or control in a manner to satisfy the characteristics of any particular kind of water to be treated. The water to be treated is softened or purified by the simple addition thereto, on its way to the boiler, condenser or other place of use, or to a filtering or separating device where the solid constituents are to be removed, of a measured quantity of treating compound. The character and method of preparation of this compound are important features of the invention and for that reason will be first described.

The present water treating method involves the initial preparation of the treating compound and its subsequent introduction in proper amount into the water to be treated. In railway use the treating compound may be prepared at a designated station and supplied in bulk to the locomotives for introduction into the water when the water supply for the locomotive is replenished, or a treating compound preparation apparatus may be installed in connection with each water tank along the line and the treating compound may therefore be mixed with the water at the tank and supplied in that form to the locomotive.

Referring to the drawing, 1 illustrates a suitable reservoir or container in which are placed or collected the necessary ingredients to form the special water treating compound. The ingredients may be mixed elsewhere and placed in the reservoir, or they may be mixed in the reservoir itself. The material is permitted to flow by gravity, or is delivered by a pump or the like, to an electrical cell 2, which is conventionally shown, but which includes two suitable end electrodes made of suitable material, such as lead, and between which are located two groups of transversely disposed plates, such as lead plates 3 and aluminum plates 4, said plates alternating and being free of conductive connection with each other or with the current leads, except through the liquid, and being separated by narrow gaps 5, and with the two end electrodes connected to opposite leads from a source of electric current. In this cell the mixture or compound is subjected to the effect of an electric current, preferably 110 volt alternating current, although direct current may be employed. The amperage may vary between 7 and 15 amperes. At the higher amperage more metal enters the solution, so that current control offers one means of regulating the buffer content of the treating solution. The treatment may be intermittent in the sense that the cell may be filled with material which is subjected to the current effect for a predetermined time, but preferably the process is continuous and the liquid mixture is allowed to flow continuously through the cell at such a rate as to produce the necessary electrical effect upon it during its passage through the cell. For this purpose the several plates and electrodes are preferably arranged in such manner as to compel the liquid to travel by a more or less tortuous path through the cell in order to increase efficiency. This is simply a matter of properly arranging the plates and electrodes with reference to the inlet and outlet so as to secure the necessary effect. The product of the cell is collected in a third vessel 6 in the form of a finished compound, which is more or less permanent in form and can be shipped from place to place, and which is always ready for mixture with the water to be softened or purified in the manner before referred to.

The mixture or compound to be treated includes water and a suitable electrolyte, such as an alkali material, and it may also include a suitable quantity of a suitable colloidal material containing aluminum and of silicate form, such as Bentonite, a very finely divided or pulverized clay material. The alkali may be one or more or many alkaline materials, such as sodium hydrate, potassium hydrate, or the like.

In the treating cell 2 a number of effects occur, both chemical and electrical, and whatever they are or may be, it is a fact that the product of such cell, treated in the manner herein described, has been found in practice to form an efficient and satisfactory treating compound for softening boiler water, or water for other uses, as will more fully appear hereinafter.

As an example of one suitable mixture for the purposes of the invention, a suitable quantity of water, say 15 to 18 gallons, is mixed with 700 cc. of a suitable electrolyte, such as sodium hydrate, and sufficient finely divided or pulverized colloidal clay, such as Bentonite, is added to the mixture so that its total solid content is approximately 40% by weight. The mixture is thoroughly stirred to secure complete solution of the alkali, and the colloidal Bentonite becomes highly dispersed. Some Bentonite goes into solution. When the mixture described is passed through the cell at a slow rate, say at the rate of 15 to 18 gallons in not less than one hour, there is some electrolytic effect, due to ionization of the substances present by reason of the conditions of the solution and the passage of the current. The charged Bentonite is more completely dispersed so that the number of particles in the solution is vastly increased. The Bentonite used carries a natural charge, due to its original sodium content in the raw state. This charge is increased by the ionizing effect of the current and by the hydroxyl of the water film surrounding each particle, the OH ion being obtained from the hydroxide of the electrolyte.

The intensity of the charge aids the speed of reaction. It is therefore apparent that the original activity of the Bentonite has been increased and its function in aiding in the softening of water has been improved. The alkaline electrolyte, and the water, according to the theory of dissociation of substances in solution, have their molecules broken up into particles charged electrically both positively and negatively, the effect carrying over into the Bentonite as the result of its colloidal condition, and the water supplying an increased number of hydroxyl ions (OH). The action is more or less pronounced in the region of the aluminum plates, which gradually dissolve and must be replaced from time to time. The aluminum therefore seems to enter into the reaction and new compounds are undoubtedly formed, such as sodium alumino silicates and some aluminates. Furthermore, there is a disturbance of the electrical equilibrium, with an ionizing effect, so that the particles of the solid substances present become electrically charged and have the ability later on to instigate or assist in the formation of flocculent precipitates of the solid substances in the water to be treated.

However, aluminum is not the only effective metal. In practice, alternating plates of zinc and lead have been used, in which case zincates, acting similarly to the aluminates, were formed. The plates can be all of the same material, such as all aluminum, all zinc, all lead or any metal above hydrogen in the electromotive scale. All have been tried successfully and some metal entered the solution, thus increasing the hydroxyl ion content. Where the plates are all of a single metal, alternate plates are decomposed, just as in electroplating. However, with alternating current the metal enters the solution instead of plating out, as with direct current. I prefer, however, to use two metals having a difference in potential.

I have found also that the cost of the metal can be reduced by the use of metal turnings or powdered metal. In that case suitable porous pockets are used in the battery to retain the metal in proper position. They are easily refilled.

Experience shows that the electrolyzing treatment to which the compound is subjected materially decreases the free alkalinity of the mixture as a whole, because consistently upon test it requires from 25% to 30% more acid to neutralize a sample taken from the upper tank 1 than it does to neutralize a sample taken from the lower tank 3, using the same indicator, such as phenolphthalein, with the test point the same in each case. Not all of the Bentonite enters into reaction with the hydroxide, although some of it does, probably by its ability to exchange its alkaline and earth oxides. It at least assists in stabilizing conditions by its buffer action. The metal compound also acts as a buffer. Bentonite has recognized value as a flocculating medium, but by giving its particles an electrical surface charge when in colloidal suspension in water, its flocculating ability is increased because of its ability to attract and precipitate any boiler water impurity which carries an opposite charge. The hydroxyl ion concentration of the mixture desirably maintained corresponds approximately to pH 11. The Bentonite itself has a pH value of approximately 9 and tends to resist any further increase in hydroxyl ion concentration in the boiler water. It is further recognized that Bentonite has the ability to precipitate calcium sulphate out of solution, the calcium of the sulphate molecule being exchanged for the sodium of the Bentonite in the reaction. As indicated, one of the effects desired is pH control and I have shown how the hydroxyl ion concentration of the solution has been increased. It is now suggested that both the colloidal Bentonite and the compounds formed of aluminum, or of the other metals, are amphoteric, so that either the acid or alkaline radicals will act in the reaction as required. It is also known that these amphoteric materials tend to resist change in pH, consequently aiding in its control.

It is doubtless also true that the ability of this improved compound to flocculate and precipitate impurities in boiler water is increased when the compound is added to the boiler water, by reason of the increased dissociating effect in more dilute solutions, as well as by the increased temperature and pressure to which the water is subjected when it enters the boiler.

In practice the treating compound is made as follows:

The sodium hydroxide is made up in the form of a nearly saturated solution. The Bentonite is mixed with water to the consistency of a thick paste, weighing about 9 lbs. per gallon. Two parts of the dispersed Bentonite are intimately mixed with five parts of the nearly saturated concentrated sodium hydroxide solution. A high speed power mixer is utilized and advantage is taken of the heat evolved when the sodium hydrate is dissolved in water, and by interaction between the alkali and the Bentonite some sodium allumino silicate is formed directly. The ingredients mentioned can be mixed with each other in any reasonable proportions either as a thick paste or even as a solid. In practice 700 cc. of the mixture of sodium hydrate and Bentonite are mixed with 15 to 18 gallons of water and are subjected to electrical treatment as described. This produces a quantity of treating compound sufficient for treating 11,000 gallons of water for supply to boiler equipment. In practice this amount of water has been effectively softened by the use of 15 to 18 gallons of treating compound containing the ingredients mentioned above in amounts as stated and subjected to the treatment heretofore described. The amount of reagents in this quantity of treating compound is considerably below the amount quantitatively necessary and usually employed in boiler water treatment. This boiler water, prior to treatment, carries approximately 7 grains of hardness per gallon. By the addition of 15 to 18 gallons of the treating compound divided into portions at intervals so as to uniformly treat the entire 11,000 gallons, the hardness is reduced from 7 grains per gallon to from .25 to .9 grains per gallon. The solid material is precipitated in flocculent form, such as in a soft, non-adherent sludge or deposit which is either readily filtered out, such as when it is desired to use the water in a laundry, or which in the case of boiler water is readily washed out or flows away when the boiler is blown down.

Silica is another material which cannot be effectively removed or precipitated solely by the use of chemical reagents, but which, in the case of the electrically ionized compound of this invention, readily precipitates in flocculent form, due to more or less exact control of the hydrogen ion concentration to a critical point wherein soluble and slightly soluble substances change their physical conditions and tend to flocculate or precipitate in flocculent form rather than remain as a colloidal solution or suspension.

That the electrical treatment to which the compound is subjected in the treating cell is an important and necessary treatment has been conclusively established by comparison of the effects in the boiler of electrically treated compound and compound not electrically treated. Of course, alkalies, such as sodium hydrate and Bentonite or colloidal clay materials may individually produce chemical effects in the softening of boiler water, but a mixture thereof, treated in the manner described, produces a largely increased softening effect over the untreated mixture. For example, I have hereinbefore referred to boiler water which upon its introduction into the boiler carries a hardness of approximately 7 grains per gallon. Treated with my compound, produced by electrical treatment in the manner described, the hardness of the water has been reduced from 7 grains per gallon to from .25 to .9 grains per gallon. To observe the effect of the present compound, but not subjected to electrical treatment, I have operated the said boiler with electrically treated compound, thereby reducing its hardness to the value stated, approximately .25 grains per gallon, and then interrupted the boiler operation by substituting some of my compound which had not been subjected to electrical treatment, the dosage thereof being the same. Observation showed that immediately the hardness of the water in the boiler increased from .25 to about 3.0 grains per gallon. In other words, the electrical treatment had so modified my treating compound as to enable it to reduce the hardness considerably more than if the compound had not been subjected to electrical treatment.

As an addition to the various alkali electrolytes that may be used in the compound, silicate of soda has been found to be of material benefit. The colloidal silicate particles add to the flocculating power of the compound, largely by adsorption.

While the action of silicate of soda under heat and pressure in a boiler is not fully understood, this material has been largely used in water softening and, as stated, I have found its addition to my compound of material benefit in a number of practical tests.

What I claim is:

1. A water softening compound, comprising water containing an alkali and a finely divided clay material and ionized by placing it in a circuit carrying an electric current.

2. A water softening compound, comprising water containing an alkali, finely divided alumino-silicate material and an alkali metal silicate and ionized by placing it in a circuit carrying an electric current.

3. A water softening compound, comprising water containing sodium hydrate, finely divided clay, and ionized by placing it in a circuit carrying an alternating electric current.

4. A water softening compound, comprising water containing sodium hydrate, finely divided clay, and silicate of soda, and ionized by placing it in a circuit carrying an alternating current of about 110 volts and 7 to 15 amperes.

5. The method of forming a water softening compound, consisting in placing in a circuit carrying an electric current a quantity of water containing an alkali and a finely divided clay material.

6. The method of forming a water softening compound, consisting in placing in a circuit carrying an alternating electric current a quantity of water containing sodium hydrate and a finely divided clay material.

7. The method of forming a water softening compound, consisting in placing in a circuit carrying an alternating current of about 110 volts and 7 to 15 amperes a quantity of water containing sodium hydrate, a finely divided clay material, and sodium silicate.

8. The method of treating water to soften the same, consisting in placing a quantity of aqueous liquid containing an alkali and a colloidal clay material in the presence of aluminum, passing an electric current through the liquid, to combine aluminum particles with oppositely charged ions of dissociated water to form molecules in the liquid, and then bringing the liquid into contact with water containing hardness constituents to aid in the removal of such constituents by interaction with said molecules 9. The method of treating water to soften the same, consisting in placing a quantity of aqueous liquid containing an electrolyte and a colloidal clay material in a cell containing aluminum, passing an electric current through the cell including the aluminum, and withdrawing the liquid from said cell and mixing it with the water to be softened.

10. The method of treating water to soften the same, consisting in placing a quantity of aqueous liquid containing an electrolyte and a colloidal clay material in a cell containing zinc, passing an electric current through the cell including the zinc, and continuously withdrawing the liquid from said cell as fast as it is activated and supplying it to the water to be softened.

11. A method of treating water to soften the same, consisting in placing a quantity of aqueous liquid containing an electrolyte and a colloidal clay material in a cell equipped with electrodes and containing a body of metal disposed in the liquid and connected with said electrodes only through the solution in the cell, passing an electric current through the cell, thereby dissolving a portion of the metal, and continuously withdrawing the liquid from the cell as fast as it is activated and supplying it to the water to be softened.

12. The method of forming a water-softening compound, consisting in placing a quantity of liquid containing an alkali and a finely divided clay material in a cell containing spaced aluminum plates connected electrically to each other only through the solution in the cell, and passing an electric current through said cell and its contents.

13. The method of forming a water-softening compound, consisting in placing a quantity of liquid containing an alkali and a finely divided clay material in a cell containing spaced zinc plates connected electrically to each other only through the solution in the cell, and passing an electric current through said cell and its contents.

14. A water-softening compound, comprising water containing an alkali and a finely divided alumino silicate material and ionized by placing it in a circuit carrying an electric current.

15. A method of forming a water-softening compound consisting in placing a quantity of liquid containing an electrolyte and a finely divided clay material in a cell containing alternate plates of two metals having a substantial difference in electromotive potential and electrically connected only through the liquid in the cell, and passing an electric current through the cell and its contents including the metal plates.

LEO A. LUX.